US00RE34475E

United States Patent [19]

Custers et al.

[11] E Patent Number: Re. 34,475

[45] Reissued Date of Patent: Dec. 14, 1993

[54] APPARATUS FOR AUTOMATICALLY REPRODUCING PREFERRED SELECTIONS FROM A RECORD CARRIER

[75] Inventors: Pieter H. Custers, Asten, Netherlands; Ludovicus M. C. Verhulst, Vienna, Austria

[73] Assignee: U.S. Philips Corporation, New York, N.Y.

[21] Appl. No.: 821,348

[22] Filed: Jan. 14, 1992

Related U.S. Patent Documents

Reissue of:

[64] Patent No.: 4,779,252
Issued: Oct. 18, 1988
Appl. No.: 745,558
Filed: Jun. 17, 1985

U.S. Applications:

[63] Continuation of Ser. No. 598,313, Oct. 12, 1990, abandoned.

[30] Foreign Application Priority Data

Jul. 2, 1984 [NL] Netherlands ..... 8402095

[51] Int. Cl.[5] ..... G11B 27/30; G11B 21/08; G11B 19/12

[52] U.S. Cl. ..... 369/32; 369/33; 369/47; 369/30

[58] Field of Search ..... 360/69, 75, 72.1, 72.2, 360/78.04; 369/30, 32-34, 41-43, 47, 48, 50, 59, 233, 180, 178, 49; 358/342

[56] References Cited

U.S. PATENT DOCUMENTS

| | | | |
|---|---|---|---|
| 4,224,644 | 9/1980 | Lewis et al. . | |
| 4,321,635 | 3/1982 | Tsuyuguchi | 360/72.2 |
| 4,476,499 | 10/1984 | Kanamaru et al. | 369/48 |
| 4,523,305 | 6/1985 | Cheeseboro | 369/33 |
| 4,538,253 | 8/1985 | Ishibashi et al. | 369/34 |

FOREIGN PATENT DOCUMENTS

| | | | |
|---|---|---|---|
| 886928 | 4/1981 | Belgium . | |
| 0054438 | 6/1982 | European Pat. Off. . | |
| 8301638 | 8/1983 | France . | |
| 56-25273 | 3/1981 | Japan | 358/342 |
| 57-127975 | 8/1982 | Japan | 369/48 |
| 57-181405 | 11/1982 | Japan . | |
| 59-40379 | 3/1984 | Japan . | |
| 59-119579 | 7/1984 | Japan | 369/33 |
| 59-215076 | 12/1984 | Japan | 369/33 |
| 7901801 | 9/1980 | Netherlands . | |
| 2062935 | 5/1981 | United Kingdom | 369/30 |
| 2091021 | 7/1982 | United Kingdom | 369/47 |
| 2102184 | 1/1983 | United Kingdom . | |
| 2142465 | 1/1985 | United Kingdom | 369/33 |

OTHER PUBLICATIONS

BKSTS Journal, "Interfacing A-V Equipment to Compact Disc", Margadant, Jul. 1983, pp. 384-387.

*Primary Examiner*—Jerry Smith
*Assistant Examiner*—Steven R. Garland
*Attorney, Agent, or Firm*—Leroy Eason

[57] ABSTRACT

A compact-disc digital audio player is described in which a user can store preferred selections on selected discs in a memory. The player can identify the disc from the subcode on the disc and can read the corresponding preferred selection out of the memory to play this preferred selection.

7 Claims, 2 Drawing Sheets

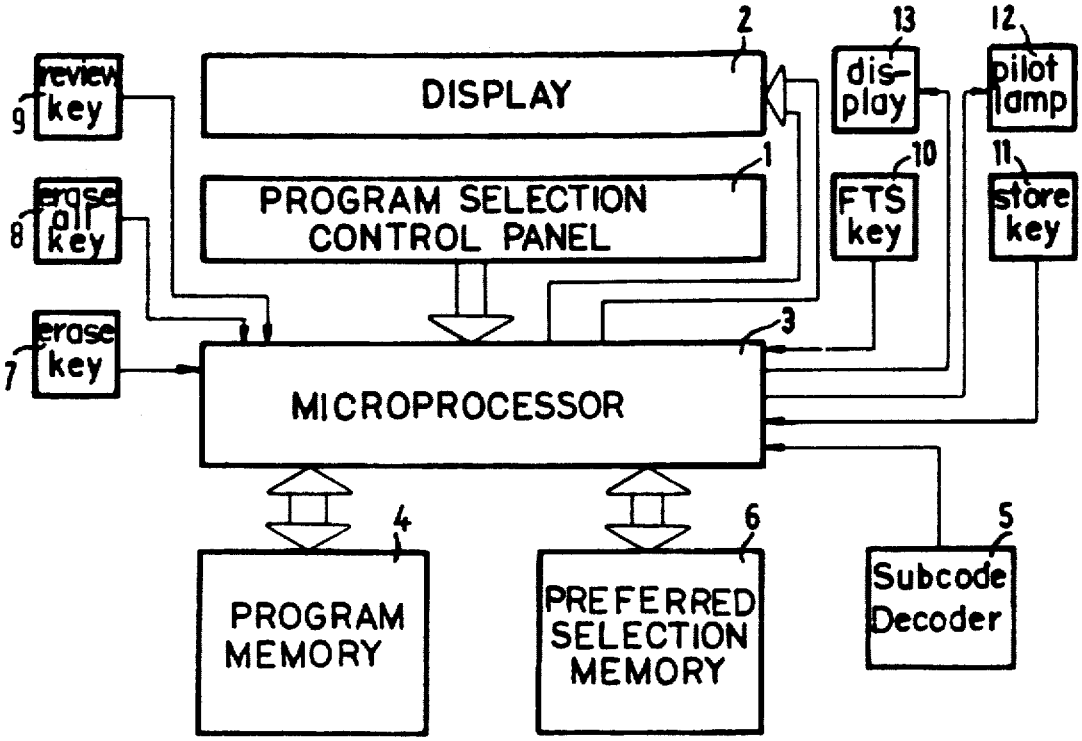
FIG.1
| NO | MIN | sec | fr's |
|---|---|---|---|
| 01 | 00 | 02 | 32 |
| 02 | 10 | 15 | 12 |
| 03 | ⋮ | ⋮ | ⋮ |
| 04 | ⋮ | ⋮ | ⋮ |
| ⋮ | ⋮ | ⋮ | ⋮ |
| A0 | 01 | 00 | 00 |
| A1 | 07 | 00 | 00 |
| A2 | 52 | 48 | 41 |
ID = " 32-15-12-72-48-41 "
FIG.2
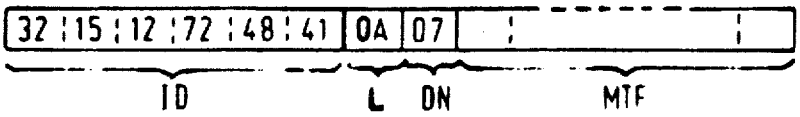
FIG.3

APPARATUS FOR AUTOMATICALLY REPRODUCING PREFERRED SELECTIONS FROM A RECORD CARRIER

Matter enclosed in heavy brackets [ ] appears in the original patent but forms no part of this reissue specification; matter printed in italics indicates the additions made by reissue.

*This is a continuation of Reissue application Ser. No. 07/598,313, filed Oct. 12, 1990, now abandoned.*

FIELD OF THE INVENTION

The invention relates to an apparatus for reproducing information from a record carrier, which apparatus comprises read means for reading said record carrier and control means for controlling the read means in such a way that a selected part of the information can be reproduced.

BACKGROUND OF THE INVENTION

An example of such an apparatus is a compact-disc digital audio player. The record carrier from which information is reproduced is an optically readable disc containing information. Such a compact-disc digital audio play is, for example, available from N.V.Philips'-Gloeilampenfabrieken under the type designation CD 304 at the time of filing of the present Application. This player comprises keys which enable the portion to be played to be selected prior to playing. For this purpose a subcode is used. This subcode is contained in the digital audio information and includes a running indication of the music passage (track no.) being reproduced, an index (part of a track), and relative and absolute time. The various known players have a facilities for programming the track no., index or time, or a combination of these parameters. The keyed-in selection may be stored in a memory for the duration of a playing cycle.

SUMMARY OF THE INVENTION

The invention aims at improving the ease of operation of such an apparatus and is based on the recognition of the fact that a user will generally make the same preferred selection from a specific disc.

The invention is characterized by identification means for identifying a record carrier before it is played, storage means for storing identifications of a plurality of record carriers and the corresponding preferred selections, means for detecting whether the identification of a record carrier to be played is stored in the storage means, and means for setting the control means in such a way that if the storage means contain an identification which corresponds to the identification of the record carrier to be played, the preferred selection thereon as stored in the storage means will be played.

The apparatus in accordance with the invention automatically plays the preferred selection on a disc which has already been selected by the user and whose [data] *identification* is stored in the storage means.

The invention is not limited to compact-disc digital audio players. The invention may also be in conjunction with, for example, video disc players and digital magnetic and optical recorders.

With respect to the identification in the case of an apparatus for reproducing digital audio information encoded in accordance with the compact-disc digital audio standard, the invention may be characterized further in that the identification means receive a subcode [to] for identifying the record carrier to be played.

Use could then be made of the catalog number or author/title indication which may be contained in the subcode. However, since to date the presence of this data is not prescribed by the standard, the relevant data will not be present on all discs and so said solution is not entirely satisfactory. A more satisfactory solution is characterized in that the identification means can identify the record carrier to be played by selecting predetermined bit groups from the record-carrier index which is contained in the subcode.

This provides a substantially unique identification of the record carrier to be played.

If an apparatus in accordance with the invention includes a control panel which enables the [use] *user* to make a preferred selection by setting the control means, the apparatus may be characterized further by write means for optionally writing into the storage means the identification found after loading of the record carrier and the preferred selection made by means of the control panel.

For an efficient use of the available storage capacity this apparatus may be characterized further in that the write means are adapted to combine a code representing the [second] *record* carrier identification and a code representing the preferred selection into blocks which are stored in the storage means, the read means being adapted to consecutively read said blocks in order to detect whether the identification of a record carrier to be played corresponds to the identification stored in the storage means.

A preferred embodiment of the invention may be characterized further in that the write means are adapted to add to the blocks a sequence number and a code which indicates the position of the next block, and the read means are adapted to determine the address of the next block [being] as a function of the stored length of the block *being* read.

Further, it is advantageous if this preferred embodiment comprises means for displaying the sequence number of the block which identifies a record carrier to be or being played.

The use of a sequence number in addition to the identification and the display of this sequence number enables the user to keep a record of his preferred selections in a simple manner, for example by marking the record carrier sleeve with the sequence number; indeed, the sequence number is much simpler than the generally very complex identification code.

BRIEF DESCRIPTION OF THE DRAWINGS

The invention will now be described in more detail, by way of example, with reference to the drawings, in which:

FIG. 1 shows schematically an embodiment of the invention,

FIGS. 2 and 3 are diagrams to explain the operation of the embodiment shown in FIG. 1.

DESCRIPTION OF THE PREFERRED EMBODIMENTS

Figure 4:
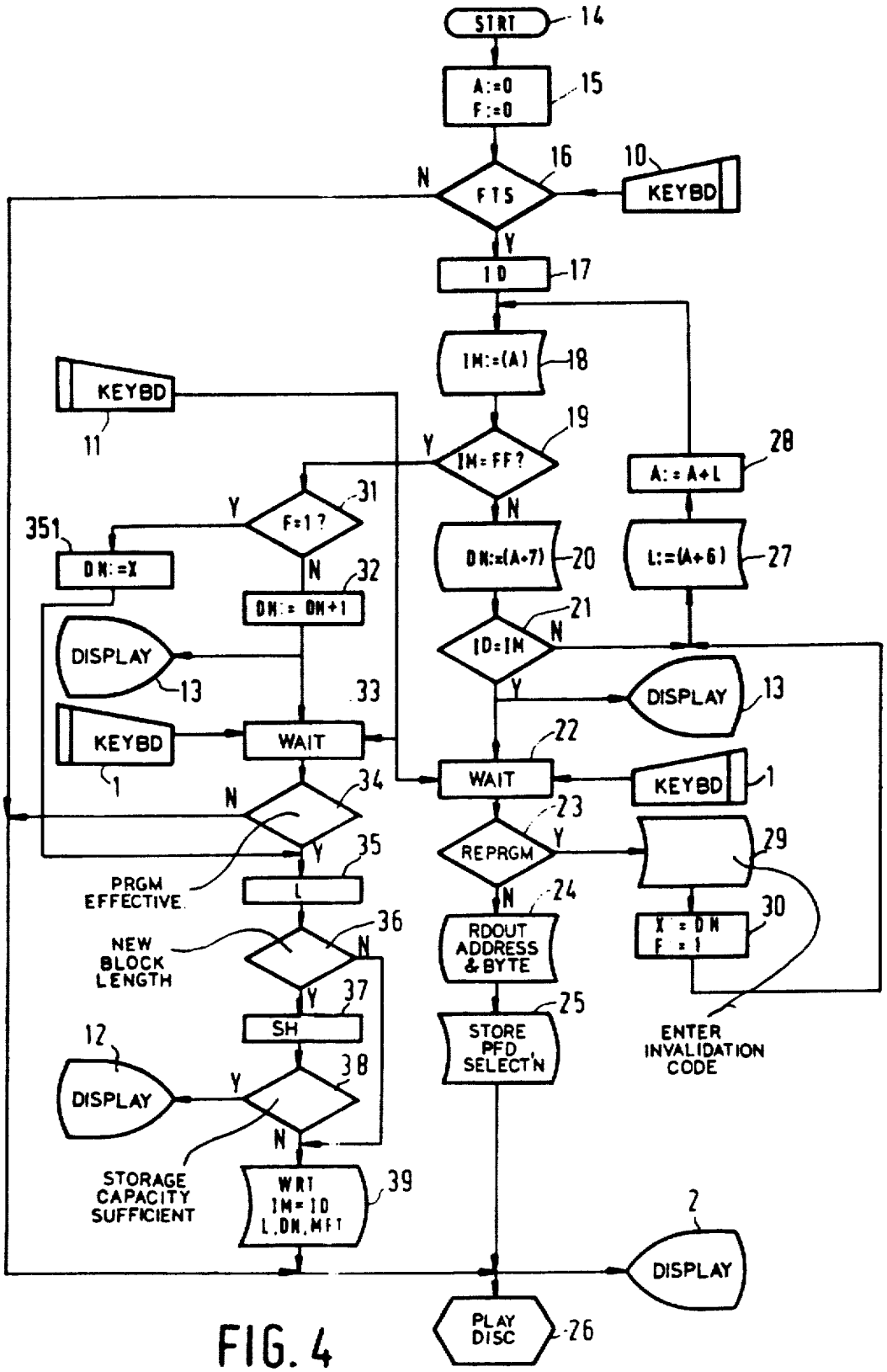
FIG. 4 is a flow chart to explain the programming of the microcomputer 3 used in the embodiment shown in FIG. 1.

FIG. 1 shows the block diagram of a compact disc player insofar as it is relevant to the present invention.

The description is based on known commercially available compact-disc players such as, for example, the player which is available from N.V.Philips'Gloeinlampenfabrieken under type number 304. These known players comprise a program selection control panel 1, for example a row of keys each of which corresponds to a specific track number and a display 2 which displays the selected choice by, for example, a row of lights each corresponding to a specific track number. Apart from the possibility of programming a track-number selection, it may also be possible to make a selection by index (parts of tracks), time within a track number, or absolute time. A microcomputer 3, i.e. microprocessor, scans the control panel 1 and drives the display 2. Further, the microcomputer 3 can store the program selection in a program [7] memory 4 and read it therefrom to control the player in such a way that the selected items on the disc to be played are reproduced. For this purpose the microcomputer 3 receives a subcode from a subcode decoder 5, which subcode is contained in the music data on the disc and is a running code representing inter alia track numbers, index and time, so that the microcomputer receives information about the location on the disc which is being played.

In accordance with the invention, the player has the possibility of storing preferred program selections of a plurality of discs in a memory, identifying discs to be played and, if desired, playing the preferred program [selection] *selections*. For this purpose the microcomputer 3 is programmed to derive a disc identification code ID from the subcode supplied by the decoder circuit 5. The identification code may be, for example, a catalog number contained in this subcode or an indication of a composer, performer, title etc. But, at least to date, this data is not contained in the subcodes of all discs. Therefore, it is more advantageous to derive identification code ID from data present on every disc. One possibility is to select specific bit groups from the index table present on every disc, which table is shown schematically in FIG. 2. This index table comprises serial data in the form of groups of 4 bytes ($4\times8$ bits) represented in hexadecimal notation in FIG. 2. The first byte of every group represents the track number. The second, third and fourth bytes represent the time after the beginning of the disc at which said track starts, expressed specifically in: minutes (2nd byte), seconds (3rd byte) and frames (4th byte), one frame being equal to 1/75 second. The index of all the track numbers is followed by three 4-byte code blocks whose first bytes are A0, A1, and A2, respectively. The second byte of the block with the initial byte A0 represents the number of the first track on the disc to be played, which number need not necessarily be one because a continuous sequence of numbers may be assigned to a plurality of discs. The third and the fourth bytes of this group are both 00. The group with the initial byte A1 in a similar way represents the number of the last track in the second byte, and the third and the fourth byte are 00. The second, the third and the fourth byte in the group with the initial byte A2 represent the time from the beginning of the lead-out track in minutes, seconds and frames respectively.

The numbers of minutes and seconds of the first track number are not arbitrary. The number of frames (4th byte) is generally more or less arbitrary and is selected as the first byte of the disc identification code ID. Both the number of seconds and the number of frames of the second track may be regarded as more or less arbitrary and therefore these two bytes have been selected as the second and the third bytes of said ID code, said bytes being for example 00 if the disc contains only one track. The second hexadecimal half of the second byte of the group with the initial byte A1 together with the second hexadecimal half of the second byte of the last group may be selected to form together the fourth byte of the identification code ID. The fifth and the sixth byte of this code are constituted by the last two bytes of the last group which indicate the number of seconds and frames from the beginning of the lead-out track. In FIG. 2 the selected bytes have been encircled and together with the selected numerical examples they constitute the hexadecimal code 32-15-12-72-48-4. In practice, the resulting disc identification code may be regarded as a unique code. In this respect it is to be noted that an identification code may be derived from the information to be reproduced instead of from a subcode which is not necessarily present.

The disc identification code ID described with reference to FIG. 2 is derived from the subcode supplied by the decoder circuit 5 by suitably programming the microcomputer 3. Together with the preferred selection this code is stored in a memory 6. This information should be preserved in the memory 6 also after the player has been switched off, for example by the use of battery-powered RAM memories or non-volatile memories. In this first case the required storage capacity hardly affects the price and it is possible to select an organization such that a specific storage capacity is reserved for each disc-selection number (this is a sequence number assigned to a disc whose preferred selection has been stored), which capacity should be large enough to store a maximum number of selected tracks. In the case of non-volatile memories the storage capacity is still a factor which must be taken into account. In order to enable the preferred selections of a maximum number of discs to be stored, a memory organization is preferred such that no excess storage capacity is reserved. All the selections made are then stored directly after each other. Random access to the memory is then no longer possible because the various identification codes are no longer stored at fixed addresses. The memory is filled contiguously, a code being assigned to each block, which code indicates the length of this block and enables the address of each subsequent block to be computed. FIG. 3 shows an example of such a block. The first six bytes of the block comprise the identification code ID; the next byte is an indication of the location of the next block, which is achieved in the present example by indicating the length L of the block; the following byte indicates the sequence number DN of the relevant disc within the selection of discs in conformity with the preference laid down by the user. This sequence number makes it easier for the user to keep a "record", for example by marking the sleeve of the disc with this sequence number. Finally, the block comprises a variable number of bytes MFT representing the selection made by the user. Since this selection can be made in different ways, it may be required to have bits which indicate the type addressing (track numbers, index or time) and merging bits. Alternatively, the various types of addressing may be combined. Examples of these are:

track-number addressing. This demands one byte per choice.

index-addressing within specific track. This requires two bytes per choice, namely one for the track number and one for the index.

time within the selected track which requires 5 bytes, namely one for the track number, two for the starting time (mins,; secs.) and two for the ending time, absolute-time selection, which requires four bytes, namely two for the starting time and two for the ending time.

In order to indicate the last block stored in the preferred-selection memory 6 the next byte after the last block is encoded in a predetermined manner, for example in hexadecimal notation with FF. The next new block may then be stored at this location if the storage capacity of the memory allows this.

If a block is cancelled, for example by erasing a block or by re-selection of a program for a disc for which a selection has been made previously, which new selection cannot always be accommodated within the storage location occupied by the previous selection, this can be indicated by filling the location for the ID code with a code which indicates that this block is not valid and must be skipped. The cancelled blocks are used again by shifting the information when the memory is full. This is done because in specific types of non-volatile memories erasing and writing reduces the lifetime and demands a comparatively long time. If these drawbacks do not exist the cancelled blocks may be filled immediately by shifting the next blocks. An alternative for the cancellation of a block in the case of re-entry is to enter the new selection at the location of the old selection and, if the storage area is not adequate, to store a pointer which refers to the location where the remainder of the information is stored.

When a re-entry at the end is selected either the old sequence number may be maintained or the next number of the sequence may be chosen.

In the example described here the sequence number is maintained.

With respect to control and display special provisions may be made for keying in the selection made and for displaying this selection, but it is advantageous to employ the keyboard 1 and the display 2. In addition, the following functions (shown schematically in FIG. 1) may be provided:

An erase key 7 by means of which a specific block in the preferred-selection memory can be invalidated when the sequence number of said block is also keyed in.

An erase-all key 8 for erasing the entire preferred-selection memory in the case of a reorganization by he user. This key 8 must be protected to preclude inadvertent erasure of the program, which can be achieved if several operations have to be performed for such an erasure.

A review key 9 which enables the user to check the entire contents of the preferred-selection memory by displaying the sequence numbers with corresponding programs in a specific rhythm in numerical order of the sequence numbers.

An FTS key 10 by means of which the user can choose between reproduction of the preferred selection and the storage of a preferred selection.

A store key 11 which enables the selection made to be keyed in to microcomputer 3 via the keyboard 1.

A pilot lamp 12 which indicates when the preferred-selection memory is full (or, as an alternative, another display may be caused to blink), and A display 13 which displays the sequence number of the identified disc or the disc number to be stored.

FIG. 4 is the flow chart of the programming of the microcomputer 3 in a preferred embodiment of the invention.

In block 14 the program is started, for example by putting on a disc. Subsequently, a number of parameters are initialized in block 15, such as the parameters A which indicate the address in the preferred-selection memory 6 and F a flag which is used in the program. In block 16 it is ascertained whether the user wishes to make use of the possibility of reproducing the preferred selection or wishes to employ the programming facility, for which purpose the position of the FTS key 10 is scanned. If the user does not wish to use the preferred-selection facility, the program proceeds directly to block 26 to play the disc in the customary manner, as the case may be with a single selection via the keyboard 1, which program choice is stored in the program memory 4. If the user wishes to use the preferred-selection facility the identification code ID of the disc is determined in block 17 in accordance with the rules described with reference to FIG. 2. In block 18 the identification code IM is then read out of the preferred-selection memory 6 at address A which has been initialized in block 15, i.e. for the first time at the first location in the memory. Subsequently, it is checked in block 19 whether the code IM is identical to the code FF which indicates that the memory does not contain any further preferred selections. If this is not the case the sequence number DN of the disc is read out at the address A+7 bytes in block 20. After this, in block 21 it is ascertained whether the read-out disc-identification code IM corresponds to the identification code ID of the disc to be played. If this is not the case, the length L of the block (see FIG. 3) at 6 bytes after address A is read to in block 27 and subsequently the address is incremented by said length L in block 28, after which the program returns to block 18.

Leaving the loop 18-19-20-21-27-28 is possible in two ways; either the specific disc code is not contained in the memory, in which case the loop is left via block 19, or the disc code is stored, in which case an affirmative answer to the question ID=IM is obtained in block 21. The sequence number DN found in block 20 is then displayed by the display 13 as a sign that the disc to be played has the said sequence number and as a sign that reprogramming is possible if the user wishes to do so. Then a waiting time is observed in block 22 while the store key and the keyboard 1 are interrogated to allow the user the reprogram. Subsequently, it is ascertained in block 23 whether reprogramming has been effected. If reprogramming has taken place an invalidation code is entered at address A in block 29 as a sign that the relevant preferred selection has become invalid. Subsequently, in block 30 the sequence number of the disc is stored by means of a parameter X and the flag F is set F:=1) and the program returns to the search loop 18-19-20-21-27-28 in block 27 to leave said loop via block 19 after the last preferred selection. If no reprogramming is detected in block 23, the program proceeds to block 24 in which at an address 8 bytes after address A the preferred selection MFT corresponding to the loaded disc is read out of the memory 6, after which this preferred selection is stored in the program memory 4 in block 25. The program is then completed in block 26, the program in the memory 4 being displayed by the display 2. This program may have been obtained by reading out the preferred-selection memory 6 or by programming without preferred selection (output "N" in block 16).

If the identification number ID of a disc to be played does not correspond to one of the disc numbers stores in the preferred-selection memory or if reprogramming is to be effected, block 19 is left via output "Y", to proceed to block 31 where the flag F is tested (F = 1). If this is not the case, the disc is a disc whose identification number has not been stored in the memory and—since he FTS key 20 has been actuated—which is to be stored as a preferred selection. For this purpose a waiting time is observed in block 33 while the keyboard and the store key 11 are scanned, to allow the user to key in the program, the sequence number to be assigned to the disc being displayed by the display 13. The last sequence number read (see block 20) is therefore incremented by one in block 32. After this, it is ascertained in block 34 whether programming has been effected, to proceed directly to block 26 if this should not be the case.

IF the test F = 1 in block 31 is found to be true (output Y), the disc is a disc whose preferred selections have been reprogrammed (in block 22). In accordance with block 35 the sequence number DN is the value x stored in block 30, i.e. the value of the sequence number at the original location in the memory, after which the program proceeds to output Y of block 34. At this point in the program the address in the preferred-selection memory 6 is the next address after the last preferred-selection block and the values to be stored of the sequence number DN, the disc identification code and the preferred-selection program MFT are known. For this storage the length of the new block is determined in block 36 and in block 36 it is ascertained whether the storage capacity is still sufficient for this block. If the storage capacity is still sufficient the program proceeds to block 38 to store the values of IM, DN and MFT in the preferred-selection memory 6; and subsequently, the program proceeds to block 26 in order to carry out the preferred program indicated by means of the keyboard 1 or to remove the disc, or to carry out another program which should not be stored in the preferred-selection memory. If block 36 shows that the storage capacity is not sufficient, the memory is re-organized in block 37 by shifting the preferred-selection blocks in such a way that invalidated blocks (see block 29) are overwritten. After this it is checked again in block 38 whether the storage capacity is sufficient. Should this not be the case the pilot lamp 12 is energized and in the other case the program proceeds to block 39 to carry out the further program already described.

What is [claim] *claimed* is:

1. In an apparatus for reproducing information from a record carrier, said apparatus having read means for reading information from said record carrier and control means for controlling [and] *the* read means in such a way that [a] selected [part] *parts* of the information [read by the read means can] *on said record carrier will* be *automatically* reproduced, said apparatus comprising:

storage means for storing respective identifications of a plurality of record carriers and preferred selections [respectively] corresponding to [said] *the respective* record carriers;

identification means for determining the identification of a to be played record carrier:

means for detecting whether or not the determined identification of said to be played record carrier is stored in said storage means; and means for setting said control means so that if said storage means, as detected by said detecting means, does contain an identification corresponding to the determined identification of said to be played record carrier, the *parts of the information on said record carrier which are* preferred [selection] *selections* stored in said storage means corresponding to said [to be played] record carrier [is] *are* automatically *read from said record carrier as it is* played.

2. An apparatus as claimed in claim 1 further comprising:

a control panel for enabling the user to make a selection to set said control means for controlling the reading of information from said to be played record carrier by said read means, said control panel including write means for optionally writing into said storage means a preferred selection of a record carrier and the determined identification found after the loading of said to be played record carrier, and selection means for making said preferred selection of said record carrier stored in said storage means.

3. An apparatus as claimed in claim 2, wherein the write means are further adapted to combine a code representing the identification and a code representing the preferred selection and write the combination as blocks into the storage means; and wherein said blocks are read consecutively by a reading means for detecting whether the determined identification of a to be played record carrier corresponds to one of the respective identifications stored in the storage means.

4. An apparatus as claimed in claim 3, wherein said blocks further having added thereto by said write means a sequence number and a code which indicates the position of the next block; and wherein the address of the next block is determined by said reading means as a function of the [stored] length of the block *being* read.

5. An apparatus as claimed in claim 4, further comprising means for displaying the sequence number of the block which corresponds to a record carrier to be or being played.

6. Apparatus as claimed in claim 1, wherein said identification means receive a subcode supplied by a decoder circuit for identifying said to be played record carrier, the information on said record carrier being digital audio information encoded in accordance with a predetermined compact-disc digital audio standard.

7. An apparatus as claimed in claim 6, wherein the identification means can identify said to be played record carrier by selecting predetermined bit groups from a record-carrier index which is contained in said subcode.

* * * * *